(Model.)
H. A. HYLE.
VISE.
No. 294,736. Patented Mar. 4, 1884.
Fig. 1.
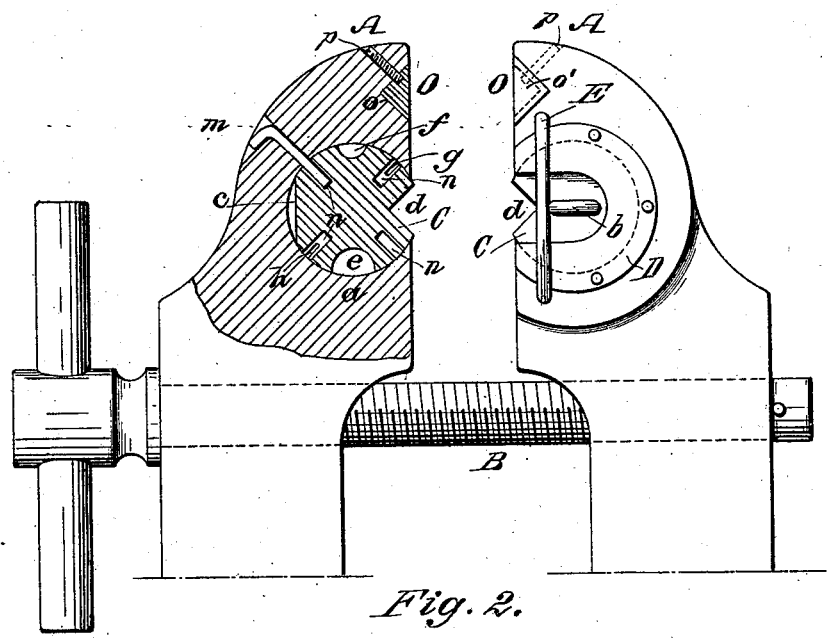
Fig. 2.
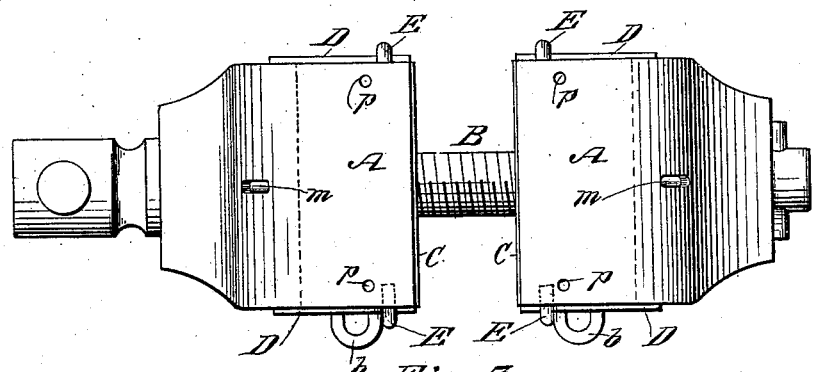
Fig. 3.
WITNESSES:
INVENTOR:
H. A. Hyle
BY Munn & Co
ATTORNEYS.
N. PETERS, Photo-Lithographer, Washington, D. C.

UNITED STATES PATENT OFFICE.

HENRY A. HYLE, OF REDWOOD, NEW YORK.

VISE.

SPECIFICATION forming part of Letters Patent No. 294,736, dated March 4, 1884.

Application filed December 14, 1883. (Model.)

*To all whom it may concern:*

Be it known that I, HENRY A. HYLE, of Redwood, in the county of Jefferson and State of New York, have invented a new and Improved Vise, of which the following is a full, clear, and exact description.

Reference is to be had to the accompanying drawings, forming part of this specification, in which similar letters of reference indicate corresponding parts in all the figures.

Figure 1 is a sectional side elevation of my new and improved vise. Fig. 2 is a plan view of the same, and Fig. 3 is a perspective view of one of the grasping blocks or cylinders.

The invention will first be described in connection with the drawings, and then pointed out in the claims.

Referring to the drawings, A A represent the jaws of the vise, and B represents the operating-screw. The jaws A are correspondingly recessed, as shown at *a*, in such manner as to cut away a part of the faces of the jaws, as shown in Fig. 1; and in the recesses *a* are placed the grasping blocks or cylinders C C, which protrude slightly from the openings in the faces of the jaws, for grasping and holding any object placed in the vise. The cylinders C C are duplicates of each other, and are by preference made of chilled cast-steel. They are held against endwise movement in the recesses *a* by the horseshoe-shaped plates D, secured to the side surfaces of the jaws A, and they are adapted to be revolved in the recesses *a* by the handles *b;* and they are each formed with the flat face *c*, for holding flat objects; with the triangular longitudinal groove *d*, for holding square or angular objects; with the large and small concaved grooves *e f*, for holding round objects; with the narrow slots *g h*, for holding narrow and flat or edged objects; with the shallow, short, triangular, and concaved recesses *i j*, for holding pointed objects; and they are also formed with the angular and concaved transverse recesses *k l*, for holding objects in vertical position. The slot *g* in each of the cylinders C is chamfered off at its ends, as shown at *i' i'*, also for holding pointed objects. The plates D, besides serving to hold the cylinders C against longitudinal movement in the recesses *a*, also serve to prevent dust, filings, &c., from entering the recesses *a* and obstructing the free revolution of the cylinders in the recesses.

*m m* represent pins passed through orifices made in the jaws A, and adapted to enter holes *n*, made in the cylinder C, for keying the cylinders in any desired position, according to the shape of the object to be held in the vise; and E E represent removable staples, which straddle the recesses *a*, as shown in Fig. 1, for strengthening the jaws and preventing the upper parts thereof from spreading away from the lower part, as will be understood from said Fig. 2.

In using the vise it will be understood that the cylinders C C will be set according to the shape of the object to be held, so as to bring the recesses or cavities of the cylinders conforming nearest to the shape of the object to the opening in the faces of the jaws A, so that when the jaws are brought together for grasping the object it will be held in such recesses or cavities, and held with great firmness and without marring the object.

Between the cylinders C and the top of the jaws A are formed in the faces of the jaws the angular grooves *o o*, running parallel with the cylinders C, and in these grooves are placed solid triangular bars O O, with flanges *o'* at their ends. The bars O are held in place by the screws *p p*, running through the top of the jaws A at an angle with the ends of the angular bars O.

By removing the bars O the angular grooves *o* may be used for the purpose of holding small angular pieces in such manner that their upper corners may be brought up and over the top of the jaws, (if the cylinders C prove too low for the purpose,) so that a plane or file may be run over the protruding corner, as in making pins or planing off light pieces of wood, or handles, &c.; or very small cylinders similar to the lower cylinders, C, may be used for the purpose in place of the grooves *o* and bars O.

Having thus described my invention, what I claim as new, and desire to secure by Letters Patent, is—

1. The jaws A, recessed, as shown at *a*, in such manner as to remove a portion of the faces of the jaws, in combination with the cylinders C, placed in the said recesses, the cylinders being formed with cavities of various shapes and adapted to be turned in the jaws, substantially as and for the purposes described.

2. The combination, with the recessed jaws A, of the cylinders C, formed with the longitudinal and transverse recesses or cavities, for holding objects in horizontal and vertical positions, substantially as described.

3. The cylinders C, formed with cavities or recesses and with the flat portions c, substantially as and for the purposes described.

4. The cylinders C, placed in recesses made in the jaws, and formed with the narrow slots for holding flat or edged objects, as set forth.

5. The cylinders C, placed in recesses made in the jaws, and formed with shallow and short recesses i j, for holding pointed objects, as set forth.

6. The combination, with recessed jaws A and cylinders C, placed in the jaws, of the plates D, for holding the cylinders in place, and for preventing the entrance of dust, &c., substantially as described.

7. The cylinders C, formed with cavities and placed in recesses a, and provided with the handles b, for revolving the cylinders, substantially as described.

8. The combination, with the cylinders C, placed in the recesses a, of the key-pins m, arranged for holding the cylinders, substantially as set forth.

9. The jaws A, having recesses a formed in them, for receiving the cylinders C, in combination with the removable staples E, for strengthening the jaws and for preventing them from spreading, substantially as described.

10. The cylinders C, adapted to be placed and revolved in the recesses a of the jaws A, and formed with angular cavities or recesses for holding angular objects, as set forth.

11. The cylinders C, adapted to be placed and revolved in the recesses a, made in the jaws A, and formed with the concaved recesses for holding round objects, substantially as set forth.

HENRY A. HYLE.

Witnesses:
NEWTON RAND,
E. H. SMITH.